E. J. VON HENKE.
WELDING AND ANNEALING HIGH SPEED STEEL.
APPLICATION FILED MAY 14, 1917.
1,252,746.
Patented Jan. 8, 1918.
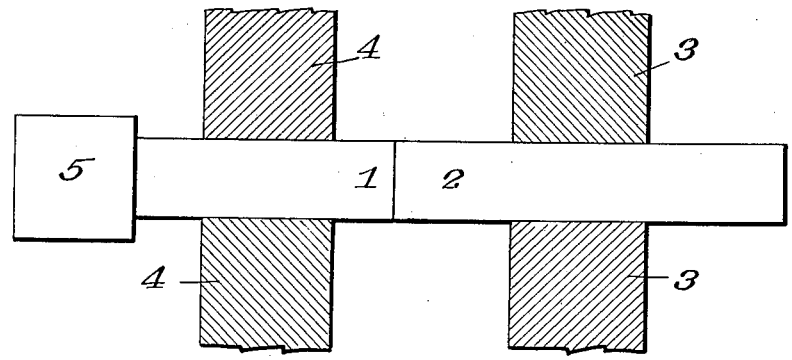
Edmund J. Von Henke, Inventor
By his Attorneys
Townsend & Decker

UNITED STATES PATENT OFFICE.

EDMUND J. von HENKE, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

WELDING AND ANNEALING HIGH-SPEED STEEL.

1,252,746.

Specification of Letters Patent.

Patented Jan. 8, 1918.

Application filed May 14, 1917. Serial No. 168,332.

*To all whom it may concern:*

Be it known that I, EDMUND J. von HENKE, a citizen of the United States, and a resident of Lynn, in the county of Essex and State of Massachusetts, have invented certain new and useful Improvements in Welding and Annealing High-Speed Steel, of which the following is a specification.

My invention relates to the electric welding and annealing of steel.

One of the more useful applications of the invention is the welding of steel such as high-speed steel to another piece of metal such as machinery steel and the invention will therefore be described more particularly with reference to such application.

In the welding of high-speed steel to machinery steel it has been always difficult to obtain a satisfactory weld when the cross-section of metals welded exceeded one square inch. This was due to the fact that the heat was localized at the weld, the remainder of the high-speed steel remaining cool, and when the welded tool was put in the furnace in order to anneal it and equalize the stresses caused by unequal heating, the mass of metal was too large to absorb the heat quickly, thereby permitting the welded joint to cool down considerably, which fact has produced minute cracks in the surface of the high-speed steel which extended farther when the tool was subjected to vibration.

More generally stated my invention consists in annealing the steel in the welded, instead of in the furnace, by conducting the electric welding operation in the usual way, opening the welder clamp, which engages the high-speed steel and immediately passing heating electric current into the piece of high-speed steel back of the previously clamped portion and through the weld to keep up the temperature of the weld while at the same time bringing the rest of the material to any desired temperature quickly without loss of heat.

In the accompanying drawing I have shown the manner of carrying out my invention by employing electric welding clamps of typical form.

1 indicates the piece of high-speed steel to be welded to another piece of material such as machinery steel indicated at 2 to form a tool. 3, 3 indicate the clamps for the piece of machinery steel, 4, 4 the clamps for the piece of high-speed steel, and 5 a block or piece of copper or other good conducting material arranged as a stop block for the piece 1 and adapted to supply current thereto from any desired source, as for instance from the same source as clamps 4, by being electrically connected therewith in any desired way.

In conducting the operation the two pieces are clamped in the usual way in clamps 3, 4, and the operation of welding the piece 1 to the piece 2 is performed in the usual manner. As soon as the weld is effected the clamp 4 is quickly opened and current is sent from the block 5 through the piece of material 1 and through the weld to the piece 2 and clamp 3. The welded point being the hottest, the resistance of the metal at that point is the greatest, and the passing current keeps up the temperature of the weld, while, at the same time, it brings the rest of the tool on the high-speed end to any desired temperature quickly without loss of heat. It takes an average 1 to 1½ minutes to anneal the tool completely, while it could not be brought to the temperature in the furnace in less than 15 to 20 minutes.

Obviously the invention might be practised by the use of other appliances than those described since all that is necessary is that current be passed through the piece 1 from its rear end back of the welding clamps, after the opening of said clamps at the completion of the welding operation, to maintain the temperature of the weld and bring the whole body of the piece 1 quickly up to the required temperature.

What I claim as my invention is:—

1. The herein described improvement in electrically welding and annealing steel, consisting in welding the material in a welding machine in the ordinary way, opening the clamps through which the welding current is applied and immediately thereafter passing heating current into the material at a point to the rear of the portion engaged by the clamp to keep up the temperature of the weld while at the same time bringing the previously clamped portion to the desired temperature without loss of heat.

2. The herein described improvement in welding and annealing high-speed steel when the same is welded to machinery steel, consisting in electrically welding the two pieces of material together, opening the clamps on the high-speed steel as soon as the weld is effected and immediately thereafter passing heating electric current through the high-speed steel back of the clamped section and to and through the weld and piece of machinery steel to bring the high-speed end of the tool to the desired annealing temperature.

Signed at New York, in the county of New York and State of New York, this 12th day of May, A. D. 1917.

EDMUND J. von HENKE.

Witnesses:
F. B. Townsend,
Irene Lefkowitz.